US006988338B1

(12) United States Patent
Chen et al.

(10) Patent No.: US 6,988,338 B1
(45) Date of Patent: Jan. 24, 2006

(54) LID WITH A THERMALLY PROTECTED WINDOW

(75) Inventors: Shea Chen, Plano, TX (US); Cary C. Kyhl, Grapevine, TX (US); Donald C. Price, Dallas, TX (US); Terry V. Baughn, Richardson, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/269,893

(22) Filed: Oct. 10, 2002

(51) Int. Cl.
*E04B 7/00* (2006.01)
(52) U.S. Cl. .................. 52/171.1; 156/99; 428/34; 65/36; 65/59.1
(58) Field of Classification Search ............... 52/171.1, 52/204.5, 204.1; 428/34; 29/412, 428; 65/36, 59.1; 156/99
See application file for complete search history.

(56) References Cited

U.S. PATENT DOCUMENTS

| 2,065,404 | A | 12/1936 | Scott et al. |
| 2,708,774 | A | 5/1955 | Seelen |
| 2,768,475 | A | 10/1956 | Seelen et al. |
| 3,632,325 | A | 1/1971 | Evey ............................. 65/56 |
| 3,670,916 | A | * 6/1972 | Alpert ..................... 220/23.87 |
| 3,930,906 | A | 1/1976 | Irie et al. .................... 148/113 |
| 4,135,789 | A | 1/1979 | Hall ............................ 350/343 |
| 4,783,141 | A | 11/1988 | Baba et al. ................. 350/167 |
| 4,789,228 | A | 12/1988 | Le Pesant et al. .......... 350/355 |
| 4,812,420 | A | 3/1989 | Matsuda et al. ............ 437/209 |
| 4,828,905 | A | 5/1989 | Wada et al. ................. 428/213 |
| 4,988,157 | A | 1/1991 | Jackel et al. ................. 350/96 |
| 5,061,049 | A | 10/1991 | Hornbeck .................... 359/224 |
| 5,081,347 | A | 1/1992 | Matsumoto ................. 250/211 |
| 5,095,664 | A | 3/1992 | Zayhowski .................. 51/283 |

| 5,122,862 | A | 6/1992 | Kajihara et al. .............. 357/74 |
| 5,175,611 | A | 12/1992 | Richardson et al. ......... 257/699 |
| 5,264,393 | A | 11/1993 | Tamura et al. .............. 437/209 |
| 5,293,511 | A | 3/1994 | Poradish et al. ............ 257/434 |
| 5,352,852 | A | 10/1994 | Chun ......................... 174/52.4 |
| 5,392,155 | A | 2/1995 | Tamari ....................... 359/558 |
| 5,510,215 | A | 4/1996 | Prince et al. .................. 430/7 |
| 5,528,100 | A | 6/1996 | Igeta et al. .................. 313/477 |
| 5,650,915 | A | 7/1997 | Alfaro et al. ................ 361/707 |
| 6,072,924 | A | 6/2000 | Sato et al. ..................... 385/18 |
| 6,154,305 | A | 11/2000 | Dickensheets et al. ...... 359/225 |

(Continued)

FOREIGN PATENT DOCUMENTS

DE             244 332 A1     4/1987

(Continued)

OTHER PUBLICATIONS

Sketch A. 1 sheet, prepared by Mark B. Hanna at least as early as Dec. 18, 2000.

(Continued)

*Primary Examiner*—Carl D. Friedman
*Assistant Examiner*—Nahid Amiri
(74) *Attorney, Agent, or Firm*—Baker Botts L.L.P.

(57) ABSTRACT

A lid includes a frame, a window which is transmissive to radiation and has a peripheral edge sealingly coupled to the frame, and thermal insulating structure which thermally insulates the peripheral edge of the window. In one embodiment, the thermal insulating structure includes a ring which is made of a thermal insulating material, and extends around the window. In a different embodiment, the thermal insulating structure includes an annular gap between the window and frame, the gap extending around the window. The lid may be part of a housing with a sealed chamber therein, where the window facilitates travel of radiation between the chamber and a location external to the housing.

9 Claims, 6 Drawing Sheets

U.S. PATENT DOCUMENTS

| | | | |
|---|---|---|---|
| 6,261,867 B1 | 7/2001 | Robichaud et al. | 438/118 |
| 6,265,076 B1 | 7/2001 | McCurdy et al. | 428/432 |
| 6,461,537 B1 | 10/2002 | Turcotte et al. | 252/194 |
| 6,513,214 B2 | 2/2003 | Nishimura et al. | 29/25.35 |
| 6,559,539 B2 | 5/2003 | Tu et al. | 257/723 |
| 6,582,531 B2 | 6/2003 | Warburton | 148/280 |
| 6,667,837 B1 | 12/2003 | Shockey | 359/738 |
| 6,745,449 B2 | 6/2004 | Hanna et al. | 29/458 |
| 6,827,449 B1 | 12/2004 | Klonis et al. | 353/31 |
| 2001/0035496 A1 | 11/2001 | Hasegawa et al. | 250/338.1 |
| 2001/0053016 A1 | 12/2001 | Nelson | 359/291 |
| 2002/0192403 A1 * | 12/2002 | Hanna | |
| 2003/0101562 A1 * | 6/2003 | Hanna et al. | |

FOREIGN PATENT DOCUMENTS

| | | |
|---|---|---|
| DE | 90 03 394.9 | 8/1990 |
| DE | 195 02 006 A1 | 8/1996 |
| EP | 0 542 519 A1 | 5/2003 |
| GB | 2184 475 A | 7/1987 |
| JP | 58161950 | 9/1983 |
| JP | 361036969 A | 2/1986 |

OTHER PUBLICATIONS

International Preliminary Examination Report, 7 pages, Oct. 3, 2003.

Notification of Transmittal of the International Search Report or the Declaration (PCT Rule 44.1) mailed Apr. 11, 2002 (7 pages) re International Application No. PCT/US 02/18927, Dec. 6, 2002.

U.S. Appl. No. 09/880,365, filed Dec. 26, 2002, entitled *"Lid With Window Hermetically Sealed to Frame, and a Method of Making It"*, inventor Mark B. Hanna, Dec. 26, 2002.

\* cited by examiner

LID WITH A THERMALLY PROTECTED WINDOW

TECHNICAL FIELD OF THE INVENTION

This invention relates in general to a lid having a frame which supports a window transmissive to radiation and, more particularly, to techniques for protecting the window from damage due to thermal shock.

BACKGROUND OF THE INVENTION

An existing device includes a housing with an opening which is closed by a lid, the lid having a frame hermetically sealed to a window, and the window being transmissive to radiation in a waveband of interest. The device can be used in a television or a projector to form images, which are typically projected onto some type of screen so that they can be viewed by a person. The device includes within the housing a digital micromirror device (DMD) of a known type. A beam of radiation enters the housing through the window in the lid, and is processed by the DMD to form a plurality of sub-beams which represent an image, at least some of the sub-beams then existing the housing through the window in order to facilitate generation of the image which is projected onto the screen.

One standard technique for making such a lid involves forming a metal frame with an opening through it, placing a glass window in the opening through the frame, and then heating the frame and window until the peripheral edges of the window became fused to the edges of the opening in the frame. While this approach has been adequate for its intended purposes, it includes some disadvantages. One disadvantage was that, in order to fuse the window to the frame, the window must be heated to a temperature above its melting point, which causes imperfections to be introduced into the glass material of the window. These imperfections have to be polished out after the window had been fused to the frame, and certain other steps therefore cannot be carried out until after the polishing has been completed, including the addition of anti-reflective (AR) coatings on each side of the window. The need to polish out imperfections and apply the AR coatings separately to each window involved manufacturing costs for each lid which were higher than desirable.

As an alternative, a subsequently developed technique used a different approach to secure the window to the frame. In particular, this alternative approach did not directly fuse the edges of the window to the frame, but instead used at least one ring of sealing glass to secure a side surface of the window to a side surface of the frame. By selecting the sealing glass to have a melting temperature lower than the melting temperature of the glass material of the window, the window did not have to be heated to its melting point, which in turn avoided the introduction of imperfections into the glass of the window while coupling the window to the frame.

Since this modified approach avoided introducing imperfections into the window, it also avoided the need for an additional polishing step after coupling the window to the frame. As a result, it permitted the AR coatings to be applied to both sides of a large sheet of glass before the sheet was cut into a number of separate windows, and thus before the windows were actually coupled to frames. This reduced the cost of apply AR coatings to the windows. However, even though this approach was adequate for its intended purposes, it was not satisfactory in all respects.

In particular, lids made by both of the foregoing techniques are subjected to a thermal shock test after being manufactured, in order to eliminate any lids that might not hold up over time in response to temperature variations encountered curing normal operational use. During the thermal shock test, each lid is alternately and repeatedly immersed in two liquids having respective temperatures of −55° C. and +125° C. As to lids made by fusing the edges of the window to the frame, a high percentage of the lids survive the thermal shock test without any cracking of the glass material forming the window. On the other hand, as to lids made by securing the window to the frame with a sealing glass, the percentage of lids surviving the thermal shock test is significantly lower, because these lids show a significantly higher tendency to develop cracks within the window during thermal shock test. This reduces the effective production yield, which in turn causes the unit cost for manufacturing each such lid to be higher than desirable. Therefore, even though use of a ring of sealing glass permitted lids to be made more cheaply than when directly fusing the window to the frame, the lids made with sealing glass still had a higher cost than would be the case if production yields could be increased through reduction of the occurrence of window cracks during the thermal shock test.

SUMMARY OF THE INVENTION

From the foregoing, it may be appreciated that a need has arisen for techniques for making a lid with a window sealed to a frame, in a manner which avoids at least some of the disadvantages discussed above. The present invention addresses this need.

More specifically, according to one form of the present invention, an apparatus includes: a frame having an opening therethrough, and having on one side thereof a first annular surface portion which extends around the opening; a window transmissive to radiation of a predetermined wavelength, the window having a peripheral edge, and having on one side thereof a second annular surface portion, the window being oriented so that the second annular surface portion faces and is aligned with the first annular surface portion, with the first annular surface portion being fixedly and sealingly coupled to the second annular surface portion; and thermal insulating structure which thermally insulates the peripheral edge of the window.

According to a different form of the present invention, an apparatus has a housing with a sealed chamber therein, and the housing includes: a frame having an opening therethrough, and having on one side thereof a first annular surface portion which extends around the opening; and a window transmissive to radiation of a predetermined wavelength so as to facilitate travel of radiation of the predetermined wavelength between the chamber and a location external to the housing, the window being disposed on a side of the frame nearest the chamber and having a peripheral edge, and the window having on one side thereof a second annular surface portion and being oriented so that the second annular surface portion faces and is aligned with the first annular surface portion, the first annular surface portion being fixedly and sealingly coupled to the second annular surface portion; wherein the housing is configured to define a gap which extends around the window adjacent the peripheral edge thereof, and which thermally insulates the peripheral edge of the window.

According to still another form of the present invention, an apparatus includes: a frame with first and second sections, the first section being approximately planar, having an opening therethrough, and having on one side thereof a first annular surface portion which extends around the opening, and the second section being annular and extending away from a peripheral edge of the first section in a direction transverse to the first section, the second section having thereon an inwardly facing annular surface; and a window transmissive to radiation of a predetermined wavelength, the window having a peripheral edge, and having on one side thereof a second annular surface portion, the window being oriented so that the second annular surface portion faces and is aligned with the first annular surface portion, the first annular surface portion being fixedly and sealingly coupled to the second annular surface portion, and the peripheral edge of the window facing and being spaced from the annular surface on the second portion of the frame so as to define therebetween an annular gap which extends around the peripheral edge of the window.

BRIEF DESCRIPTION OF THE DRAWINGS

A better understanding of the present invention will be realized from the detailed description which follows, taken in conjunction with the accompanying drawings, in which.

DETAILED DESCRIPTION

Figure 1:
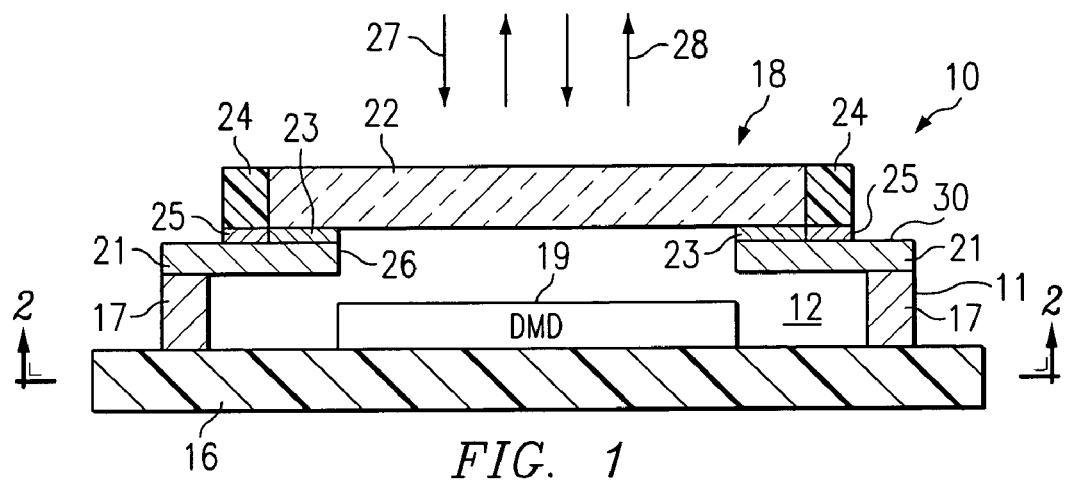
FIG. 1 is a diagrammatic sectional side view of an apparatus which embodies aspects of the present invention.
Figure 2:
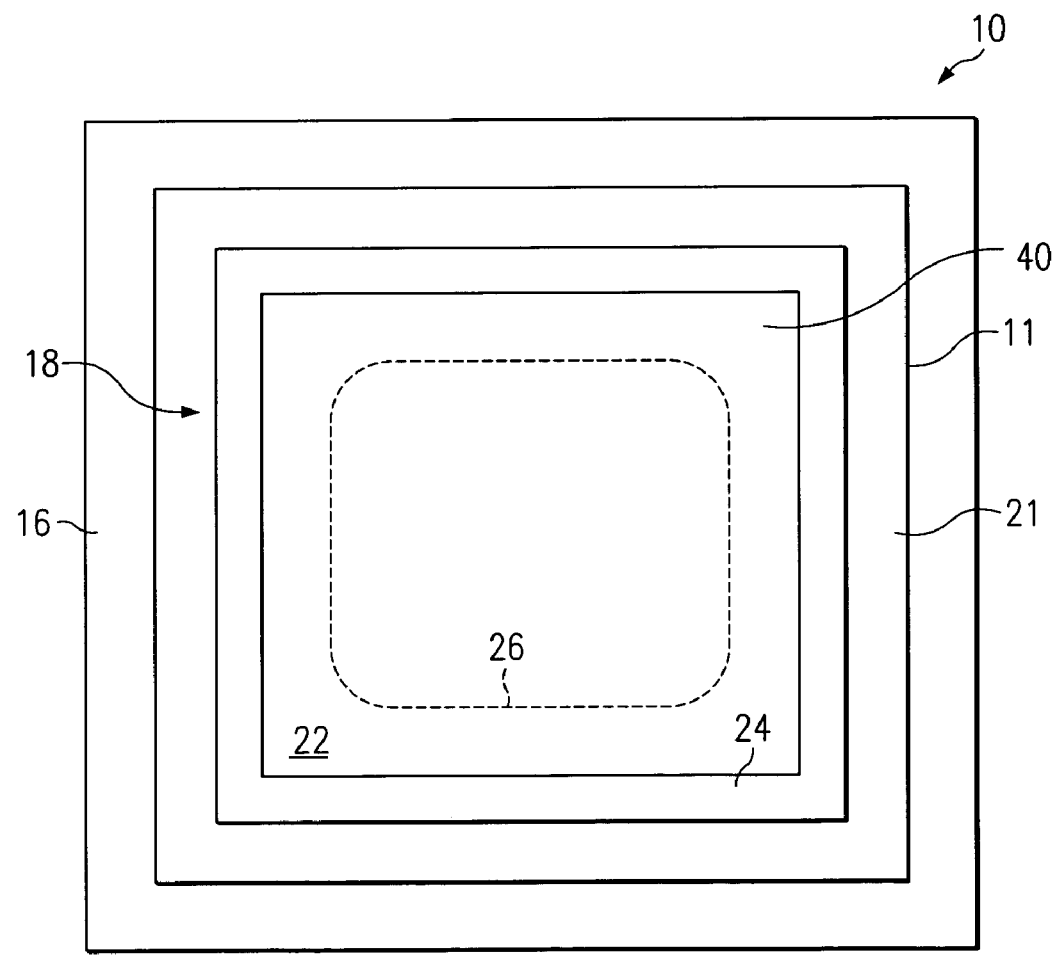
FIG. 2 is a diagrammatic top view of the apparatus of FIG. 1.

FIG. 1 is a diagrammatic sectional side view of an apparatus 10 which embodies aspects of the present invention. FIG. 2 is a diagrammatic top view of the apparatus 10 of FIG. 1. The apparatus 10 includes a housing 11 which has a sealed chamber 12 therein. The housing 11 includes a base 16, a ring 17 sealingly secured to the base 16, and a lid 18 sealingly secured to the ring 17.

The base 16 is a square plate made from a high temperature co-fired ceramic material, of a type known in the art. The base 16 could alternatively be made of any other suitable material. The ring 17 is approximately square in a top view, and has its lower edge hermetically sealed to the base 16 in a manner which is known in the art, and which is therefore not described here in detail. In the disclosed embodiment, the ring 17 is made a steel material of a known type, which is readily commercially available from a number of vendors as ASTM-F15. However, the ring 17 could alternatively be made from any other suitable material.

The lid 18 has peripheral edges which are seam welded in a known manner to the top surface of the ring 17 of the housing 11, in order to effect a hermetic seal between the ring 17 and the lid 18. A digital micromirror device (DMD) 19 of a known type is supported within the chamber 12, in the center of the top surface of the base 16. The DMD 19 is a type of photonic device. The DMD 19 has on an upper side thereof a two-dimensional array of tiny reflective micromirrors, which are not visible in the drawings. The micromirrors each correspond to a respective pixel of an image, and can each be independently physically moved by the DMD 19 in response to electrical control signals.

A gas of a known type is provided within the chamber 12. The gas serves to lubricate the mirrors of the two-dimensional array on the DMD 19, in order to facilitate their movement, and ensure that they have a relatively long operational lifetime. However, this gas is somewhat corrosive. Consequently, and as discussed later, the various portions of the housing 11 which are exposed to the corrosive gas are each made from a material that is resistant to corrosive damage from the gas. At some future time, there may be an alternative version of the DMD 19 in which the micromirrors operate satisfactorily without external lubrication. In that case, the chamber 12 could alternatively contain a vacuum, or a gas such as argon, dry nitrogen, or dry air.

The lid 18 includes an annular metal frame 21, a window 22 which is substantially transparent to radiation within a selected range of wavelengths, an annular sealing section 23 which secures the peripheral edge of the window 22 to the frame 21, and a thermal insulating ring 24 which extends around the window 22 in contact with the peripheral edge of the window 22. Window 22 has a surface portion 40 (FIG. 2). Frame 21 has a surface portion 30. In this regard, the inner edge of the ring 24 conforms in size and shape to the peripheral edge of the window 22. The bottom surface of the ring 24 is secured to the top surface of the frame 21 by an annular strip of an adhesive 25. For purposes of clarity, the thicknesses of the sealing section 23 and the adhesive 25 are exaggerated in FIG. 1.

The adhesive 25 used in the disclosed embodiment is commercially available as GE type RTV162 white adhesive sealant from General Electric Sealants & Adhesives of Waterford, N.Y. However, it would alternatively be possible to use some other suitable adhesive. In the disclosed embodiment, the ring 24 is made from polytetrafluoroethylene (PTFE). In more detail, a PTFE powder is commercially available under the trademark TEFLON as Grade 7A granular molding powder from E.I. duPont de Nemours and Company of Wilmington, Del. This powder is compressed between two surfaces while being heated to a temperature above its melting point, in order to consolidate the powder. When it is cooled and removed from between the surfaces, the result is a sheet of PTFE having a thickness which corresponds to the desired thickness of the insulating ring 24. A plurality of the rings 24 are then die cut from the sheet. In an alternative to this approach, the PTFE powder could be compressed in a mold while being heated, where the mold has a size and shape corresponding to the desired size and shape of the ring 24. Although the ring 24 in the disclosed embodiment is made from PTFE, it could alternatively be made from some other suitable material which has thermal insulating characteristics. Further, even though the ring 24 is formed by compressing and heating a powder, it could alternatively be formed in some other suitable manner.

In the disclosed embodiment, the sealing section 23 includes several different portions which are not all visible in FIG. 1, but which are each described in more detail later. Also, in the disclosed embodiment, the window 22 is transmissive to a range of wavelengths extending from approximately 420 nm to approximately 700 nm, with a center wavelength of approximately 545 nm. However, the window 22 could alternatively be transmissive to some other range of wavelengths.

A beam of inbound radiation, indicated diagrammatically by two arrows 27 in FIG. 1, passes through the window 22 and travels to the DMD 19, where each of the not-illustrated micromirrors of the DMD 19 reflects a respective portion of the beam in a respective direction determined by the current physical position of that mirror. The various independently-reflected portions of the original beam are each referred to here as a sub-beam. The plural reflected sub-beams travel away from the DMD 19 in various different directions, and at least some of them will travel back out through the window 22, as indicated diagrammatically by two arrows 28. For simplicity, the arrows representing inbound radiation 27 and outbound radiation 28 are shown as vertical lines in FIG. 1, but it will be recognized that various different beams and sub-beams would typically be traveling in various different directions.

The frame 21 of the lid 18 will now be described in more detail. The frame 21 in the disclosed embodiment is made from a known steel material, which is readily commercially available from a number of vendors as ASTM-F15. The frame 21 is plate-like and, as best seen in FIG. 2, has an outer edge which is square. The frame 21 has planar top and bottom surfaces which extend parallel to each other. The frame 21 has a central opening 26 extending vertically through it, the opening 26 having a generally rectangular shape, except that the corners are rounded.

Figure 3:
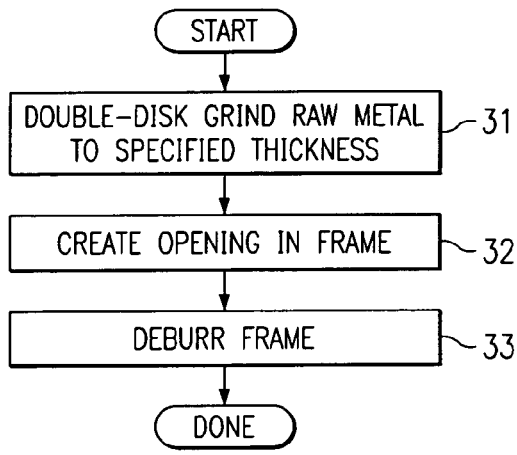
FIG. 3 is a flowchart showing a sequence of steps which can be used to make a frame that is a component of the apparatus of FIG. 1.

FIG. 3 is a flowchart showing a sequence of steps 31–33 which are carried out in order to make the frame 21 of the disclosed embodiment. As noted above, the frame 21 is made from commercially available ASTM-F15 steel material. At block 31, this raw steel material is double-disk ground to a selected uniform thickness, which in the disclosed embodiment is about 0.0085 inches. Next, at block 32, the opening 26 is created in the center of the frame 21, by coining, fine-blanking or stamping the metal material, or by some other suitable technique or machining operation. Then, at block 33, the frame 21 is deburred using known techniques.

Turning now to the window 22 of the lid 18 (FIG. 1), the window 22 is a plate-like element having parallel top and bottom surfaces, and having an outer edge with the shape of a square. The window 22 of the disclosed embodiment is made from a borosilicate glass material, which is commercially available under catalog number 7056 from Corning Incorporated of Danville, Va.

This particular glass material is transmissive to radiation in a range which extends from approximately 420 nm to about 700 nm, and which is centered at a wavelength of about 545 nm. Further, this particular glass material has an index of refraction of approximately 1.47 to 1.50 for radiation at the center wavelength of about 545 nm. However, it would alternatively be possible to use a different glass material which is tranmissive to radiation in a different range of wavelengths, or which has a different index of refraction for radiation within the range of interest. The window 22 has on each of its top and bottom surfaces an anti-reflective (AR) coating. However, these coatings are relatively thin and, for clarity, are not separately shown in FIGS. 1 and 2. The AR coatings in the disclosed embodiment are silicon oxide, but could alternatively be some other suitable material, such as magnesium fluoride.

Figure 4:
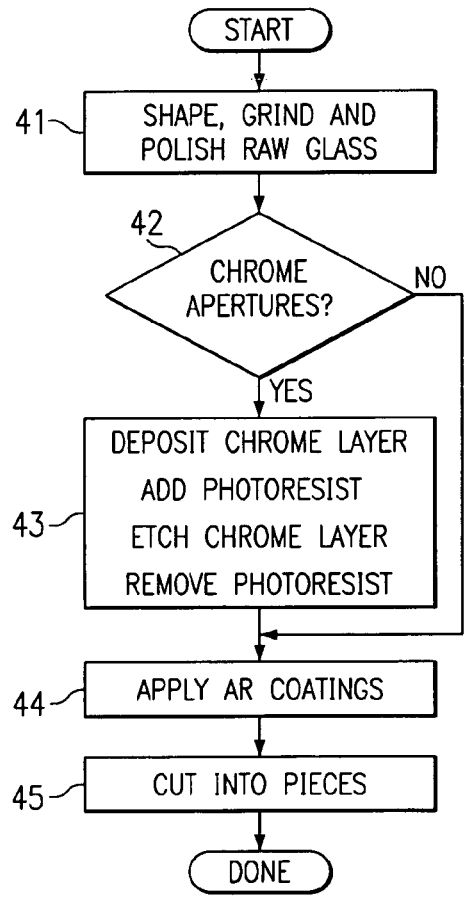
FIG. 4 is a flowchart showing a sequence of steps which can be used to make a window that is a component of the apparatus of FIG. 1.
Figure 5:
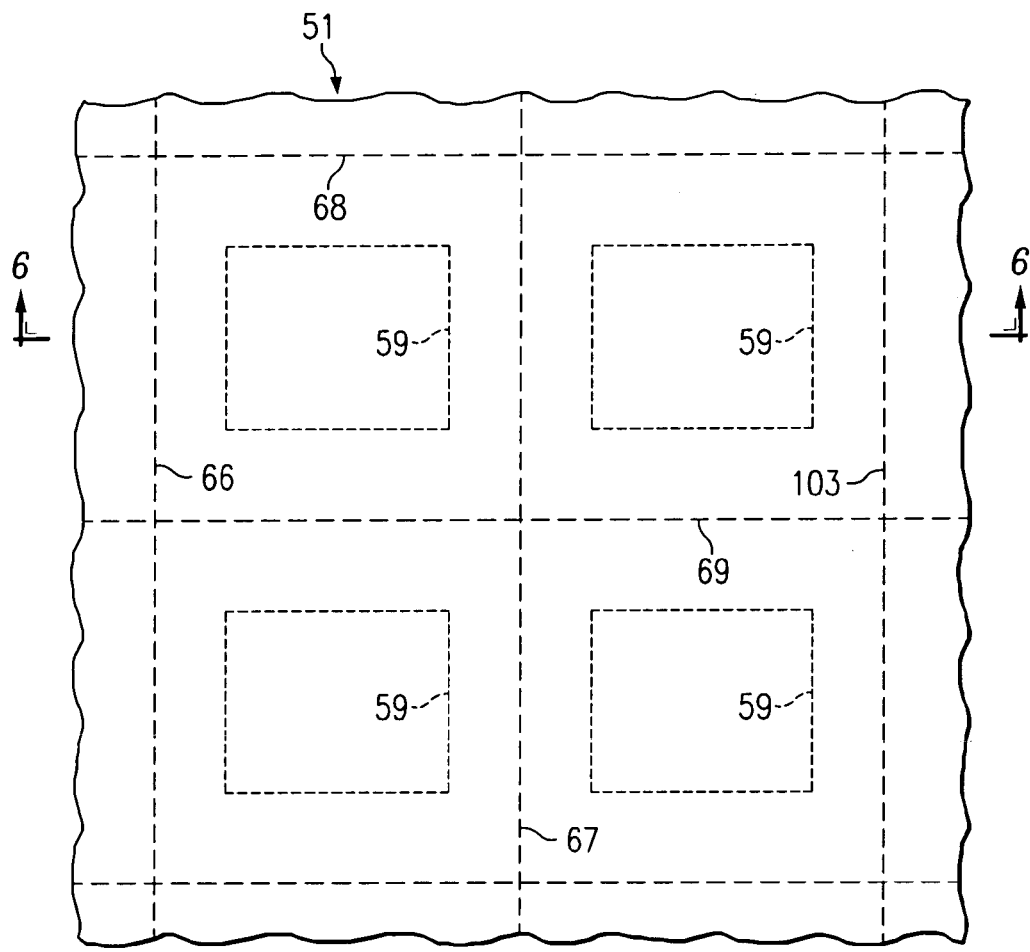
FIG. 5 is a diagrammatic fragmentary top view of a large sheet of glass material which is subjected to certain processing steps, and which is then cut into smaller pieces that each serve as a respective window of the type used in the apparatus of FIG. 1.
Figure 6:
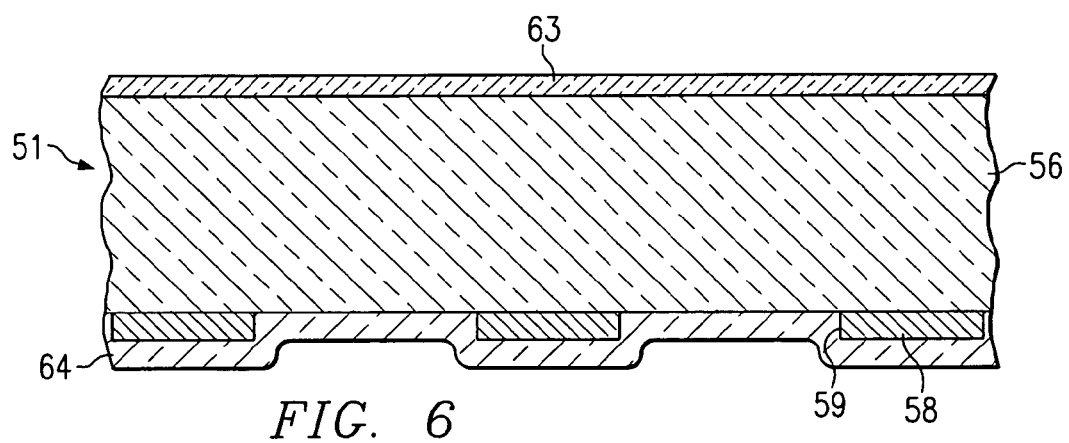
FIG. 6 is a diagrammatic fragmentary sectional side view taken along the line 6—6 in FIG. 5.

FIG. 4 is a flowchart showing a sequence of steps 41–45 which are used in the disclosed embodiment to fabricate the window 22. At block 41, the raw Corning 7056 glass material is shaped, ground and polished. These operations are carried out on a sheet of the glass material which is significantly larger than a single window 22, and which is eventually cut to form several of the windows 22, as discussed below. In this regard, FIG. 5 is a diagrammatic fragmentary top view of a multi-layer structure 51 which includes a large sheet of the Corning 7056 glass material, and which will eventually be cut to yield several windows of the type shown at 22 in FIG. 1. FIG. 6 is a diagrammatic fragmentary sectional side view taken along the line 6—6 in FIG. 5.

With reference to FIG. 5, layer 56 is the large sheet of Corning 7056 borosilicate glass material. This raw glass material is heated for approximately 16 hours at a temperature which is increased progressively from an ambient temperature of about 25° C. to a maximum temperature of about 1050° C. The heated glass material is then pressed and/or formed so that it has an appropriate length, width and thickness, which may be referred to as a "near net shape". In the disclosed embodiment, this near net shape is 6 inches long by 6 inches wide by 0.155 inches thick, but it could alternatively have some other suitable dimensions. The glass sheet is then cooled gradually back to 25° C.

Next, this glass sheet is ground and polished to specified optical criteria. In the disclosed embodiment, the specified optical criteria are that both the top and bottom surfaces of the layer 56 are polished to a flatness of 4 fringes spherical power or better, and 2 fringes irregularity or better. However, it would alternatively be possible to use other optical criteria.

Referring again to FIG. 4, a decision is made at block 42 regarding whether or not to carry out an optional step, which is the formation on one side of the glass layer 56 of a chrome layer having apertures. If this chrome layer is to be included, then block 43 is carried out. On the other hand, if the chrome layer is to be omitted, block 43 is skipped.

In block 43, a layer of chrome is deposited in a known manner on one side of the glass sheet 56, the chrome layer being indicated at 58 in FIG. 6. A not-illustrated layer of a standard photoresist material is then deposited on the chrome layer using known techniques, in a pattern which covers portions of the chrome layer other than regions that are to be etched away in order to form apertures through the chrome layer. An etching procedure of a known type is then carried out, in order to etch away exposed chrome material and thereby form apertures 59 (FIGS. 5 and 6) through the chrome layer 58. As evident from FIG. 5, the apertures 59 in the chrome layer each have a rectangular shape. The purpose of the optional chrome layer 58 with the apertures 59 will be discussed later. After the apertures 59 have been etched through the chrome layer 58, the not-illustrated photoresist layer is removed using known techniques.

Next, with reference to block 44 in FIG. 4, an anti-reflective (AR) coating is applied to each side of the partially completed structure. These coatings are shown at 63 and 64 in FIG. 6, and as mentioned above are silicon oxide. The thickness of the coatings 63–64 is selected so that the coatings 63–64 collectively effect an average transmittance of at least 98% across the wavelength range of interest, which in the disclosed embodiment includes wavelengths in the range of 420 nm to 700 nm. After application of the coatings 63–64, the result is the multi-layer structure shown at 51 in FIGS. 5–6.

Although the coatings 63–64 are silicon oxide in the disclosed embodiment, they could alternatively be some other suitable material, such as magnesium fluoride. If magnesium fluoride is used, a coating of $Al_2O_3$ may optionally be applied over each magnesium fluoride coating, to serve as a protective layer.

Next, with reference to block 45 in FIG. 4, a not-illustrated diamond wheel saw of a known type is used to cut the multi-layer structure 51 of FIGS. 5–6 into a plurality of pieces which each serve as a respective window of the type shown at 22 in FIG. 1. This is carried out by cutting the multi-layer structure 51 along each of a first group of parallel lines, some of which are indicated diagrammatically by broken lines at 66–67 in FIG. 5, and by then cutting it along each of a second group of parallel lines that extend perpendicular to the first group, some of which are indicated diagrammatically by broken lines at 68–69 in FIG. 5.

As mentioned above, the chrome layer 58 with the apertures 59 (FIGS. 5–6) is present in some embodiments of the present invention, and is omitted from other embodiments. For purposes of clarity in describing the present invention, the window 22 discussed above in association with FIGS. 1 and 2 does not include the chrome layer 58.

Figure 7:
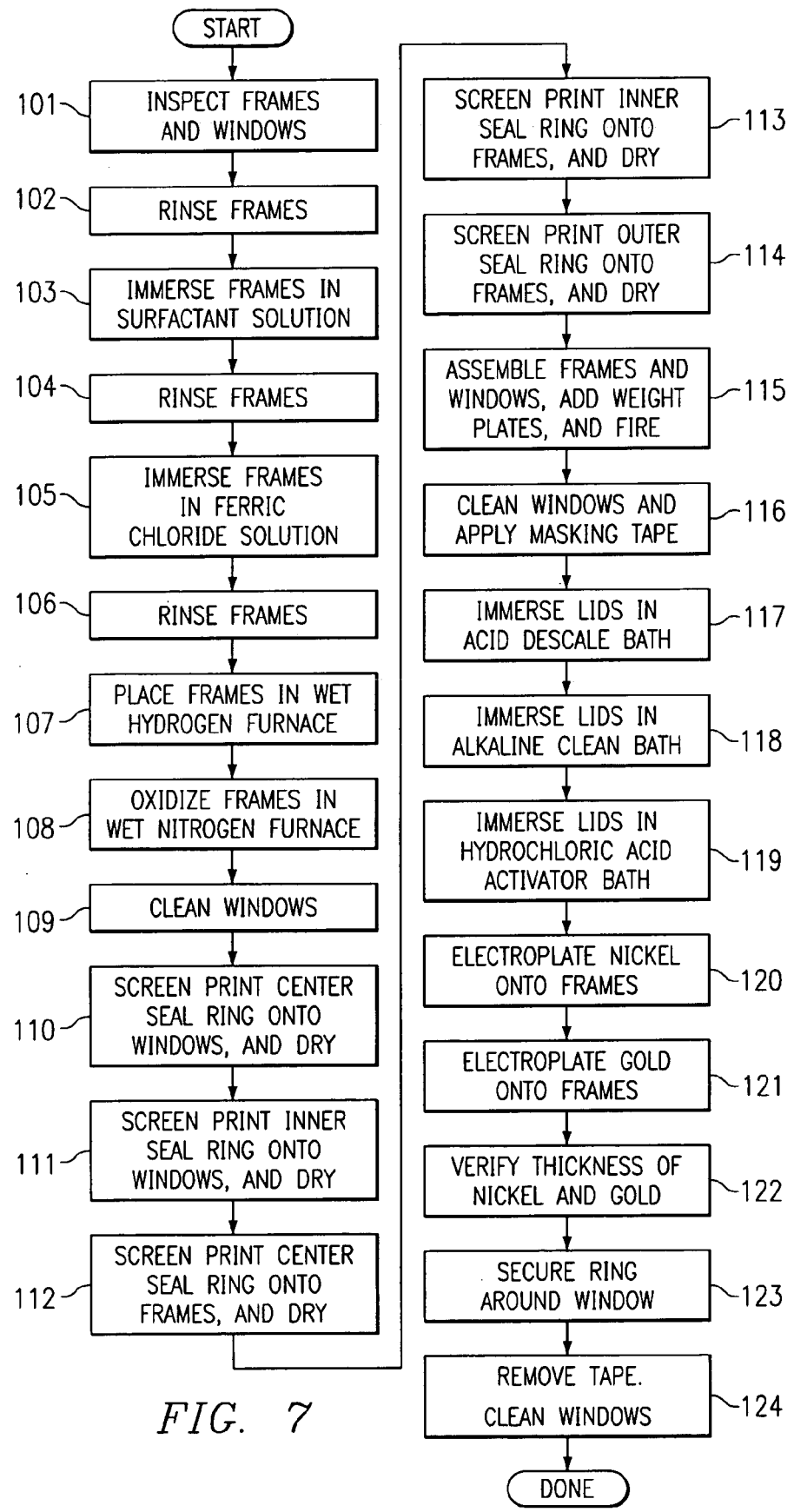
FIG. 7 is a flowchart showing a sequence of steps which embodies aspects of the present invention and which can be used in assembling an apparatus of the type shown in FIG. 1.

FIG. 7 is a flowchart which shows a sequence of steps 101–124 that are carried out in the disclosed embodiment in order to assemble the lid 18 of FIG. 1. In block 101, a sample subset of the frames made according to the procedure of FIG. 3 is subjected to inspection, and a sample subset of the windows made according to the procedure of FIG. 4 is subjected to inspection. In the disclosed embodiment, the inspections of the frames and windows are each carried out so as to obtain a 1% acceptable quality level (AQL), which is an industry standard technique where a table is used to determine the number of parts that need to be inspected in order to assure a specified quality level. The remainder of the flowchart of FIG. 7 deals with frames and windows that have passed the inspection procedure.

More specifically, in block 102, frames are loaded into a suitable support rack, and are then rinsed in deionized water. Next, at block 103, the frames are immersed in a surfactant solution (soap solution) at a temperature of approximately 60° C. for a time interval in the range of approximately 9.5 to 10.5 minutes. The rack and frames are then removed from this solution. Next, at block 104, the rack and frames are rinsed with room temperature deionized water.

Then, at block 105, the rack and frames are immersed in a room temperature ferric chloride solution for a time interval in the range of approximately 1.5 to 2.5 minutes. The rack and frames are then removed from this solution and allowed to drain. Then, at block 106, the rack and frames are rinsed with room temperature deionized water.

Next, at block 107, the frames are transferred from the rack to a ceramic plate, and are processed in a wet hydrogen furnace while maintaining a heat temperature of approximately 1050° C. for a time interval in the range of approximately 11 to 15 minutes. This serves to remove carbon, oxygen and sulfur impurities from the frames, along with other trapped contaminates, through the formation of products such as $CH_4$, $CO_2$ and $CO+H_2$. Next, at block 108, the frames are transferred to a different set of ceramic plates, and are then oxidized by processing them in a wet nitrogen furnace while maintaining a peak temperature of approximately 895° C. to 1005° C. for a time interval of approximately 9 to 13 minutes. The layer of oxidation formed on the frames in the disclosed embodiment will be dark gray in color, and will have a thickness in the range of approximately 3 to 10 Å.

Figure 8:
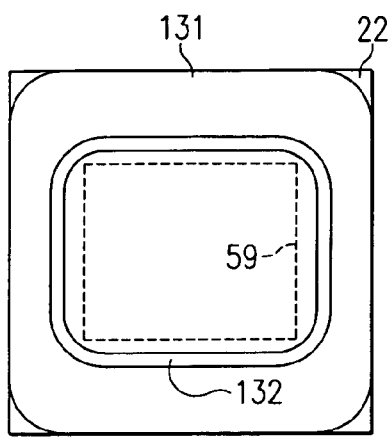
FIG. 8 is a diagrammatic bottom view of the window from the apparatus of FIG. 1, and shows two seal rings which are applied to a bottom surface thereof.

Then, at block 109, each of the windows 22 is cleaned, using a lint-free cloth and isopropyl alcohol. Next, with reference to block 110, a center seal ring is screen printed onto each window 22. FIG. 8 is a diagrammatic bottom view of the window 22, showing this center seal ring 131 thereon. The center seal ring 131 is a portion of the seal section indicated at 23 in FIG. 1. The center seal ring 131 is made from a commercially available sealing glass, which in the disclosed embodiment is a material available commercially as catalog number ESL-4026 from Electro Science Laboratories in King of Prussia, Pa. This sealing glass material is commercially marketed in the form of a paste that is directly suitable for application to the window 22 through screening printing.

As evident from FIG. 8, the outer edge of the ring 131 has approximately a square shape, and in particular conforms in size and shape to the outer edge of the window 22, except that the four outer corners of the seal ring 131 are rounded. The inner edge of the seal ring 131 defines an approximately rectangular opening, except that the corners are rounded. The material of the seal ring 131 has a melting temperature which is lower than the melting temperature of the glass material forming the window 22, and lower than the melting temperature of the metal material of the frame 21. After the center ring 131 has been screen printed onto the underside of the window 22, the window 22 and the seal ring 131 thereon are dried at a temperature of approximately 150° C. for a time interval in a range of 10 to 20 minutes. The creation and subsequent drying of the seal ring 131 correspond to block 110 in FIG. 7.

Next, in block 111 of FIG. 7, an inner seal ring 132 is screen printed onto each of the windows 22, and is then dried. The outer edge of the inner seal ring 132 has the same size and shape as the inner edge of the seal ring 131, and engages the inner edge of the seal ring 131. The inner edge of the seal ring 132 defines an approximately rectangular shape, except that the corners are rounded. The inner edge of the seal ring 132 is identical in both size and shape to the edge of the opening 26 through the metal frame 21.

Like the center seal ring 131, the inner seal ring 132 is made from a sealing glass. However, the sealing glass used for inner ring 132 is different from the sealing glass used for the center ring 131. In the disclosed embodiment, the inner ring 132 is made from a sealing glass which is available commercially as catalog number E96919-74A from Dupont Electronics of Research Triangle Park, N.C. This sealing glass has a melting temperature which is less than the melting temperature of the Corning 7056 glass used for the window 22, and less than the melting temperature of the metal material used for the frame 21. Further, the sealing glass used for the seal ring 132 is marketed in a paste form that is directly suitable for screen printing of the seal ring 132 onto the underside of the window 22. After the inner seal ring 132 has been applied to the underside of the window 22, it is dried at 150° C. for a time interval in the range of 10 to 20 minutes. It will be noted from FIG. 8 that the center ring 131 has, along its entire length, a width which is more than twice the width of the inner seal ring 132.

As mentioned above, it is being assumed for purposes of this discussion that the window 22 in FIG. 8 does not include the chrome layer 58 with one of the apertures 59 therein (FIGS. 5–6). However, if it did include the chrome layer 58 with an aperture 59, the aperture 59 would have the size, shape and location indicated by broken lines at 59 in FIG. 8.

Figure 9:
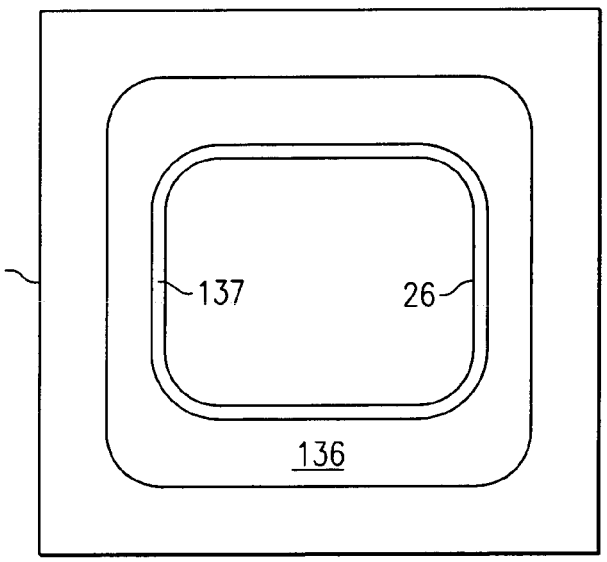
FIG. 9 is a diagrammatic top view of a frame which is a component of the apparatus of FIG. 1, and shows two seal rings which are applied to a top surface of the frame.

Next, at block 112 in FIG. 7, a center seal ring is screen printed onto each of the frames 21, and is then dried. More specifically, FIG. 9 is a diagrammatic top view of the frame 21, and shows the center seal ring 136 which is formed thereon. The center seal ring 136 is identical in size and shape to the center seal ring 131 formed on the window 22. However, the center seal ring 136 is made from a sealing glass material that is different from the sealing glass material used for the center seal ring 131 on the window 22. In particular, in the disclosed embodiment, the center seal ring 136 on the frame 21 is made from a sealing glass material which is commercially available as catalog number ESL-4035 from Electro Science Laboratories. This sealing glass material has a melting temperature which is less than the melting temperature of the Corning 7056 glass used for window 22, and less than the melting temperature of the metal material used for the frame 21. Further, the sealing glass used for the seal ring 136 is sold in a paste form that is directly suitable for screen printing the seal ring 136 onto the top surface of the frame 21. After the center seal ring 136 has been applied to the top surface of frame 21, it is dried at 150° C. for a time interval in the range of 10 to 20 minutes.

Next, at block 113, an inner seal ring 137 is screen printed onto each frame, and then dried. This inner seal ring 137 is identical in size and shape to the inner seal ring 132 provided on the window 22 in FIG. 8, and is made from the same material. The outer edge of the seal ring 137 conforms closely to the inner edge of the center seal ring 136. The inner edge of the seal ring 137 conforms closely to the inner edge of the opening 26 through the frame 21. After the inner seal ring 137 has been applied to the frame 21, it is dried at 150° C. for a time interval in the range of 10 to 20 minutes.

Figure 10:
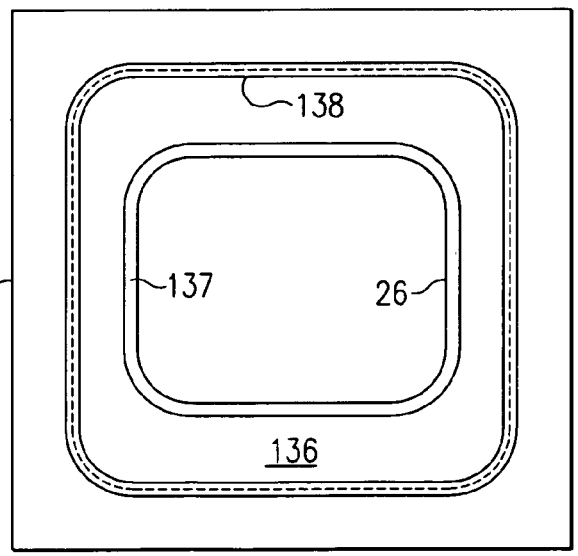
FIG. 10 is a diagrammatic top view similar to FIG. 9, but shows the addition of a third seal ring to the top of the frame.

Next, at block 114 in FIG. 7, an outer seal ring is screen printed onto each of the frames, and is then dried. In more detail, FIG. 10 is a diagrammatic top view similar to FIG. 9, except that it also shows the outer seal ring at 138. The outer seal ring 138 is made from the same material as the inner seal rings 132 and 137. The inner and outer edges of the outer seal ring 138 each define approximately a square shape, except that the corners are rounded. The inner half of the outer seal ring 138 overlaps the outer edge portion of the center seal ring 136, and the outer half of the seal ring 138 is disposed outwardly of the outer edge of the center seal ring 136. The outer seal ring 138 has a width which is approximately the same as the width of the inner seal ring 137, and thus the width of the center seal ring 136 is at least twice the width of the outer seal ring 138 at all locations along the length thereof. After the outer seal ring 138 has been applied, it is dried at a temperature of 150° C. for a time interval in the range of 10 to 20 minutes.

Figure 11:
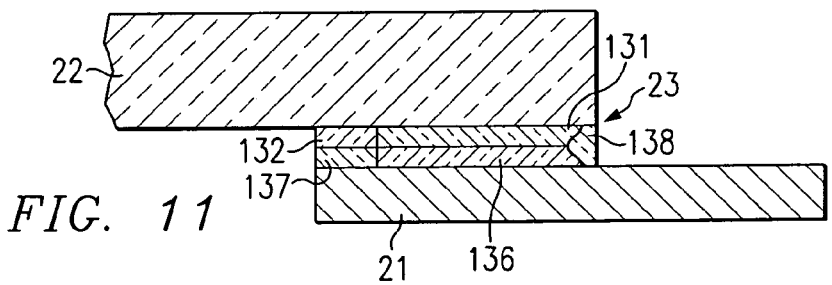
FIG. 11 is a diagrammatic fragmentary sectional side view of a selected portion of the apparatus of FIG. 1, in a significantly larger scale.

Next, with reference to block 115 in FIG. 7, each of the windows 22 is placed onto a respective one of the frames 21 in alignment therewith, so that the center and inner rings 131–132 (FIG. 8) on the window 22 are respectively aligned with and engage the center and inner rings 136–137 (FIG. 10) on the frame 21. FIG. 11 is a diagrammatic fragmentary sectional side view showing this alignment between the window 22, the frame 21, and the seal rings 131–132 and 136–138. The seal rings 131–132 and 136–138 serve as respective portions of the sealing section shown at 23 in FIGS. 1 and 11.

Each frame 21 with a window 22 thereon is placed on a not-illustrated graphite fixture, and a not-illustrated weight plate is added to urge each window downwardly toward the associated frame. These assemblies are then fired in an air atmosphere at approximately 600° C. for approximately one hour and ten minutes. This temperature is above the melting point of each of the sealing glasses 131–132 and 136–138 that form the sealing section 23, but is below the melting temperature of the metal frame 21, and is sufficiently below the melting temperature of the glass material of the window 22 so that the optical properties of the window 22 are not affected. Consequently, each of the sealing glasses in the sealing section 23 melts or softens sufficiently so that, when the frame and window assemblies are later cooled back to room temperature, the seal rings in the sealing section 23 not only serve to fixedly secure the window 22 to the frame 21, but also provide a hermetic seal between the window 22 and the frame 21. In this regard, the material of the center seal ring 131 is selected because it will bond securely to the surface of the material of the window 22, and the material of the center seal ring 136 is selected because it will bond securely to the oxidized surface of the metal frame 21. Further, the materials of the center seal rings 131 and 136 bond securely to each other.

As mentioned above in association with FIG. 1, the chamber 12 within the housing 11 contains a lubricant gas which is corrosive. The material of the inner seal rings 132 and 137 is selected because it is substantially impervious to damage from this corrosive gas. Thus, the inner seal rings 132 and 137 cooperate to define an inner seal which extends between the frame 21 and the window 22, and which protects the material of both of the center seal rings 131 and 136 from damage caused by the corrosive characteristics of the lubricant gas. The outer seal ring 138 is also provided to protect the center seal rings 131 and 132, for example from acidic solutions used during subsequent processing of the frame 21, as discussed below.

With reference to block 116 in FIG. 7, the weights are removed from the assemblies, and the assemblies are removed from the graphite fixtures. The window 22 of each assembly is then cleaned with a lint-free cloth and isopropyl alcohol. Then, plating masking tape of an industry standard type is applied to both sides of the window 22, so as to completely cover both sides thereof.

Next, with reference to blocks 117–119 in FIG. 7, the lid assemblies with the masking tape on the windows are placed in suitable racks, and are then immersed successively in an acid descale bath (block 117), an alkaline clean bath (block 118), and a hydrochloric acid bath (block 119). These baths serve to prepare the exposed surfaces of the frame 21 for plating, including removal of the oxidation that was formed on the frame 21 at block 108 in FIG. 7. As discussed above, the purpose of the oxidation was to provide a surface on the frame 21 which would ensure a secure bond between the center seal ring 136 and the frame 21. As to other surface portions of the frame 21, which are not engaged by the seal section 23, it is appropriate to remove the oxidation from these surface portions in order to facilitate plating thereof. It should be kept in mind that, as mentioned above, the inner seal rings 132 and 137 and the outer seal ring 138 serve to protect the center seal rings 131 and 136 from the acidic solutions used in steps 117 and 119 to prepare the frame 21 for plating.

Next, at step 120, the exposed surfaces of the frame 21 are electroplated with a layer of nickel having a thickness of 100–300 microinches. Then at block 121, a layer of gold is electroplated onto the layer of nickel, the gold layer having a thickness of at least 50 microinches. The gold and nickel layers help to protect the ASTM-F15 steel material of the frame 21 from damage due to environmental factors, such as the corrosive characteristics of the lubricant gas disposed within the chamber 12 in the housing 11.

Next, at block 122, the thickness of the nickel and gold layers is verified by an x-ray florescence (XRF) measurement, using techniques which are known in the art. In the disclosed embodiment, this XRF measurement is carried out on a subset of the assemblies, for example two assemblies selected randomly from each plating rack.

Next, at block 123, an annular layer of the adhesive is dispensed onto the top surface of the frame 21, in a manner so that it extends around the window 22 and is adjacent to the window 22. Then, the insulating ring 24 is slid downwardly into place around the window 22. As mentioned above, the opening through the ring 24 conforms in size and shape to the periphery of the window 22, and thus the inner edge of the ring 24 engages the outer edge of the window 22 along the entirety of their lengths. The ring 24 is pressed downwardly so that its bottom surface is pressed against the adhesive 25, and the lid is heated to 25° C. for 15 to 20 minutes in order to cure the adhesive.

Next, at block 124, the plating masking tape is taken off each of the windows 22. Then, each of the windows 22 is cleaned with a lint-free cloth and isopropyl alcohol. In occasional situations where residue from the plating masking tape is resistant to removal by the isopropyl alcohol, acetone may optionally be used with a lint-free cloth to remove the tape residue. After cleaning the windows 22 in block 124, the resulting assemblies are each a lid of the type shown at 18 in FIG. 1.

Each completed lid 18 is in due course incorporated into an apparatus such as that shown at 10 in FIG. 1. Thereafter, the apparatus 10 may be subjected to a thermal shock test before it is shipped to a customer, for example by alternatively and repeatedly immersing the apparatus in two liquids which are respectively at temperatures of −55° C. and +125° C. The insulating ring 24 reduces the rate at which thermal energy flows through the edges of the window 22 during this thermal shock test, thereby reducing the extent to which a radial temperature gradient can develop within the window 22, which in turn reduces the likelihood that cracks will develop in the window 22 as a result of large thermal gradients. The width of the material of the ring 24 is selected to provide a degree of heat transfer resistance that is sufficient to keep thermal gradients in the window 22 below magnitudes which would promote cracking of the window 22. In the disclosed embodiment, the PTFE ring 24 has a width of about 0.1 inch.

The foregoing discussion explains that the insulating ring 24 is placed around the window 22 (in block 123) before the lid 18 is incorporated into an apparatus such as that shown at 10 in FIG. 1. However, it would alternatively be possible to defer placing the ring 24 around the window 22 until after the lid 18 has been incorporated into an apparatus such as that shown at 10.

As discussed above in association with FIGS. 5–6 and 8, it is possible to provide on one side of the window 22 an optional chrome layer 58 with a rectangular aperture 59 therein. Whether or not this chrome layer is present can depend on the intended use of the apparatus 10 of FIG. 1. For example, the apparatus 10 may be used to form an image in a large-screen television, where the image will be projected onto the rear of a screen supported in a television housing. In this situation, the housing of the television will serve as a form of frame that truncates the outermost peripheral edges of the image. Consequently, it is not particularly critical whether the outermost edges of the radiation transmitted to the screen are a little uneven, because they will not be visible to the viewer.

On the other hand, the apparatus 10 of FIG. 1 can alternatively be used to form images in a projector of the type which can be coupled to a computer and will transmit to a remote screen the same image that is being displayed on the monitor of the computer. For example, a professor giving a lecture to a large class in a lecture hall might use such a projector so that all students can clearly and easily see what is happening on a computer screen. In this situation, if the image transmitted to the screen were to have uneven edges, the uneven edges would be clearly visible to persons viewing the image.

To avoid this, the chrome layer 58 with the aperture 59 is provided, and the chrome layer 58 truncates the outermost peripheral edges of the image information traveling away from the DMD 19. Consequently, the image which is projected onto the remote screen has edges that form a very precise rectangle corresponding to the edges of the aperture 59 in the chrome layer 58. Since the aperture 59 in the chrome layer is formed using a photoresist and etching techniques of the type developed for use in accurately manufacturing tiny integrated circuits, the edges of the aperture 59 can be formed with a high level of precision. Therefore, they will not appear to be uneven or ragged, even when magnified many times for purposes of projection onto a very large screen.

The foregoing discussion explains that the insulating ring 24 is formed as a physically separate part, which is then placed around the window 22. However, the insulating ring 24 could alternatively be formed in some other manner. For example, the window 22 could be mounted on a frame which is shaped to define an annular gap that extends around the window 22, and then an insulating material in liquid form could be dispensed into the gap and allowed to cure until it is a solid ring.

Figure 12:
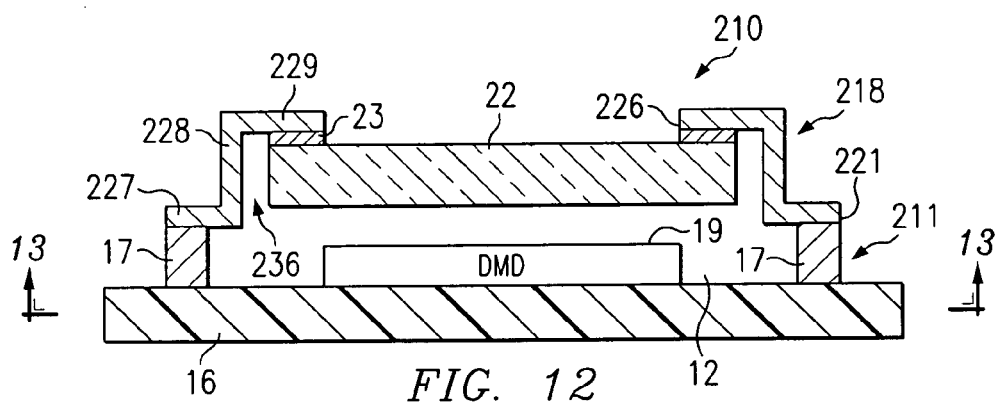
FIG. 12 is a diagrammatic sectional side view similar to FIG. 1, but showing an apparatus which is an alternative embodiment of the apparatus of FIG. 1.
Figure 13:
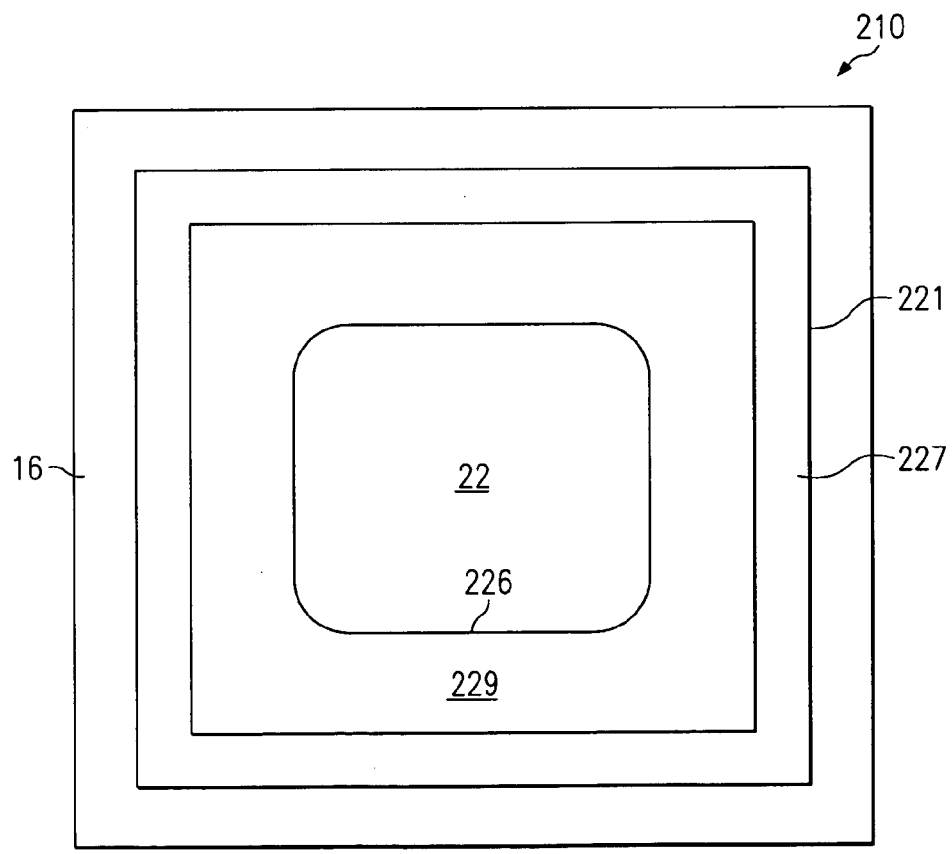
FIG. 13 is a diagrammatic top view of the apparatus of FIG. 12.

FIG. 12 is diagrammatic sectional side view of an apparatus 210, which is an alternative embodiment of the apparatus 10 of FIG. 1. FIG. 13 is a diagrammatic top view of the apparatus 210. For convenience and clarity, equivalent parts are identified in FIGS. 12 and 13 with the same reference numerals used for those parts in the embodiment of FIG. 1.

The apparatus 210 includes a housing 211 which has a sealed chamber 12 therein. The discussion which follows will focus on the differences between the embodiment of FIG. 1 and the embodiment of FIGS. 12–13. In this regard, the basic differences between the apparatus 10 of FIG. 1 and the apparatus 210 of the FIG. 12 are that (1) the apparatus 210 does not include the insulating ring 24 from the apparatus 10, (2) the frame 221 in the apparatus 210 is shaped differently from the frame 21 in the apparatus 10, and (3) the window 22 is provided on the inner side of the frame 221 in the apparatus 210, whereas the window 22 in the apparatus 10 of FIG. 1 is provided on the outer side of the frame 21.

Focusing first on the frame 221, and as evident from FIG. 12, the frame 221 has a stepped shape when viewed in cross section. In particular, the frame 221 includes a horizontally extending annular section 227 which has its bottom surface sealing secured to the top of the ring 17, an annular section 228 which extends upwardly from the inner edge of the annular section 227, and an annular section 229 which extends horizontally inwardly from the upper edge of the annular section 228. The section 229 has an inner edge that defines an opening 226 through the center of the frame 221. The opening 226 is approximately rectangular, except the corners are rounded.

The section 228 of the frame 221 is spaced outwardly from the peripheral edge of the window 22, so as to define an annular gap 36 which extends completely around the edge of the window 22. As evident from FIG. 12, the gap 236 is effectively part of the sealed chamber 12 within the housing 211. The frame 221 is fabricated in a manner similar to that described above for the frame 21 of FIG. 1, except that the frame 221 is stamped at some point in order to give it the stepped shape shown in FIG. 12. The opening 226 in the frame 221 may optionally be formed during the same stamping operation which gives the frame 221 its stepped shape.

It is believed that persons skilled in the art will understand how to fabricate the lid 218 of FIGS. 12–13 in view of the foregoing discussion of how to fabricate the apparatus 210 of FIGS. 12–13. Accordingly, a detailed discussion of the fabrication of the lid 218 is believed to be unnecessary here, and is omitted.

As mentioned above, there is an annular gap 236 between the section 228 of frame 221 and the peripheral edge of window 22. This gap 236 provides a degree of thermal insulation for the peripheral edge of the window 22 in FIG. 12, and is thus functionally comparable to the insulating ring 24 in the embodiment of FIG. 1. In particular, after the apparatus 210 of FIG. 12 has been completely assembled, it may be subjected to a thermal shock test of the type discussed above, where the apparatus 210 is alternatingly and repeatedly immersed in hot and cold liquids. Due to the presence of the gap 236, little or no thermal energy will be able to travel from the frame 221 to the peripheral edges of the window 22, thereby reducing the extent to which a radial temperature gradient can develop within the window 22, which in turn reduces the likelihood that cracks will develop in the window 22 as a result of a large thermal gradient. The width of the gap 236 is selected to provide a degree of heat transfer resistance sufficient to keep thermal gradients in the window 22 below magnitudes that would promote cracking of the window 22. In the disclosed embodiment, the gap 236 has a width of about 0.08 inch.

The present invention provides a number of technical advantages. One such technical advantage is that, by providing thermal insulation for the peripheral edge of the window, in the form of either an insulating material or an insulating gap, the number of windows which crack during thermal shock test is reduced, which in turn increases production yields, and thereby reduces the average manufacturing cost for each unit. A related advantage is that, where an insulating gap is used, an insulating effect is obtained without the need for any additional parts or materials, and thus without any increase in the cost of the materials used for the lid.

Where an insulating ring is provided around the peripheral edge of the window, a suitable insulating effect is obtained using only one additional part, which is simple and inexpensive, and which thus effects only a slight increase in the cost of the materials used for each lid. Since the insulating ring increases the production yield, the overall cost of each lid is lower, even though an additional part is used. Using either of these different forms of thermal insulation effects approximately a tenfold increase (or more) in the likelihood that a lid will survive thermal shock tests, in comparison to a pre-existing design which did not include any significant thermal insulation for the edge of the window.

Although two selected embodiments have been illustrated and described in detail, it will be recognized that substitutions and alterations are possible without departing from the spirit and scope of the present invention, as defined by the following claims.

What is claimed is:

1. An apparatus comprising:
   a frame having an opening therethrough, and having on one side thereof a first annular surface portion which extends around said opening;
   a window transmissive to radiation of a predetermined wavelength, said window having a peripheral edge, and having on one side thereof a second annular surface portion, and said window being oriented so that said second annular surface portion faces and is aligned with said first annular surface portion, said first annular surface portion being fixedly and sealingly coupled to said second annular surface portion; and
   thermal insulating structure which thermally insulates said peripheral edge of said window.

2. An apparatus according to claim 1, wherein said thermal insulating structure includes a ring made of a thermal insulating material, said ring extending along and engaging said peripheral edge of said window.

3. An apparatus according to claim 2, wherein said ring is made of polytetrafluoroethylene.

4. An apparatus according to claim 2, including an adhesive which fixedly secures said ring to said one side of said frame.

5. An apparatus according to claim 2, including a housing having a sealed chamber therein, said frame, said window and said ring each being a portion of said housing, and said window facilitating travel of radiation of said predetermined wavelength between said chamber and a location external to said housing.

6. An apparatus according to claim 5, including a photonic device disposed within said chamber.

7. An apparatus according to claim 5, including a gas disposed within said chamber.

8. An apparatus according to claim 1, including an annular sealing section disposed between and fixedly coupling said first and second annular surface portions.

9. An apparatus according to claim 8,
   wherein said frame is made of an ASTM-F15 steel material;
   wherein said window includes a borosilicate glass and has an antireflective coating on a side thereof facing said frame; and
   wherein said sealing section includes a glass material and engages said anti-reflective coating.

\* \* \* \* \*

UNITED STATES PATENT AND TRADEMARK OFFICE
CERTIFICATE OF CORRECTION

PATENT NO. : 6,988,338 B1
APPLICATION NO. : 10/269893
DATED : January 24, 2006
INVENTOR(S) : Shea Chen et al.

Page 1 of 1

It is certified that error appears in the above-identified patent and that said Letters Patent is hereby corrected as shown below:

Column 11, Line 20:
After "adhesive" insert -- 25 --.

Signed and Sealed this

Sixth Day of November, 2007

JON W. DUDAS
*Director of the United States Patent and Trademark Office*